United States Patent Office 3,472,645
Patented Oct. 14, 1969

3,472,645
METHOD OF COMBATING THE GROWTH OF ECHINOCHLOA CRUSGALLI
Jasper Daams, Weesp, Netherlands, assignor, by mesne assignments, to U.S. Philips Corporation, New York, N.Y., a corporation of Delaware
No Drawing. Continuation of application Ser. No. 563,375, July 7, 1966. This application July 23, 1968, Ser. No. 751,001
Int. Cl. A01n 9/12; C07d 91/56
U.S. Cl. 71—90          5 Claims

ABSTRACT OF THE DISCLOSURE 4,5,7-trichloro-2,1,3-benzthiadiazole used as a postemergent herbicide.

This application is a continuation of application Ser. No. 563,375, filed July 7, 1966 and now abandoned.

It is known that the compounds of the general formula:

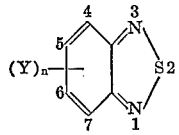

in which formula Y is a halogen atom, preferably a chlorine atom and $n=1$, 2 or 3, on the understanding that halogen atoms are not bonded simultaneously to carbon atoms 5 and 6, have a herbicidal activity, which is described as being assessed with respect to chickweed (Stellaria media), pigweed (Chenopodium album), road grass (Poa annua), spurry (Spergula arvensis), wild oats (Avena fatua), millet (Milium effusum), bush bean (Phaseolus vulgaris), tomato (Solanum lycopersicum), beet (Beta vulgaris).

These compounds are described as being suitable for counteracting the germination of weed seeds and to inhibit the growth of plants. They are said to be appropriate for use as pre-emergence means. A particularly strong herbicidal activity is said to be found with the compound 4,5,7-trichloro-2,1,3-benzthiadiazole.

Of these compounds themselves no specific possibilities of use are given.

Applicant has now found that 4,5,7-trichloro-2,1,3-benzthiadiazole has an excellent post-emergence herbicidal effect on a special weed, that is to say barnyard grass (Echinochloa crusgalli).

This property is furthermore the more particular, because said compound has, in general, on other weeds such as Poa annua (road grass), Alopecurus myosuroides, Galium aparine (cleavers), Spergula arvensis (spurry), Stellaria media (chickweed), Rumex acetosella, Polygonum convulvulus and Capsella bursa-pastoris (Shepherd's purse), an excellent pre-emergence activity and has only in comparatively high doses, a slight post-emergence effect, whereas just the reverse is the case for Echinochloa crusgalli.

The effectiveness of the inhibition is particularly high when said weed germinates or grows under moist and humid conditions respectively. Especially under wet conditions Echinochloa crusgalli can be combated by postemergence treatment by comparatively small quantities of the 4,5,7-trichloro-2,1,3-benzthiadiazole. Quantities of 250 to 1000 g. of active compound per hectare, for example, provided satisfactory results.

The results obtained are particularly important for practice in checking the growth of said weeds in cultural plants which are cultivated either on purpose or due to unfavourable weather conditions, in a moist or wet soil.

This result is quite surprising since the two types of plants belong to the family of monocotyledons. Such a selectivity in activity is found only seldom.

These results may be obtained particularly in combating or inhibiting the growth of Echinochloa crusgalli in wet rice cultures.

The use is important not only for the so-called paddy fields but also for rice directly sown. A further advantage of this use consists in that with a normal dose for combating barnyard grass no leaf damage is found in rice.

EXAMPLE

Young rice plants (Maratellie) were set in troughs filled with sandy soil. Between the rows of rice plants barnyard grass was sown. Then a water layer of 3 cm. was poured on the ground and this level was maintained during the test. When the rice plants were 33 days old (after germination), had a height of 28 cm., were in the fourth-leaf stage and when the barnyard grass plants were 3 days old, had a height of 4 cm. and were in the second-leaf stage, the troughs were sprayed once with an aqueous dispersion of a so-called wettable powder of 4,5,7-trichloro-2,1,3-benzthiadiazole in a quantity corresponding to 0.25 kg. of active compound per hectare.

During these tests a fortnight after the treatment with the weed-killer no leaf-damage of the rice could be assessed. The plants had an average height of 40 cm. and were, in general, in the fifth-leaf stage, like untreated rice plants in a check trough. However, the panic grass plants exhibited serious leaf damage, they had toppled over and no new leaves had been formed (the panic grass plants in untreated check troughs had a mean length of 9 cm. and four leaves).

In a second test series the rice plants were in the third-leaf stage and had a length of 10 cm.; the panic grass was in the second-leaf stage and had a length of 3 cm. The quantities used of 4,5,7-trichloro-2,1,3-benzthiadiazole were 1, 2 and 4 kg. per hectare.

A fortnight after the treatment the barnyard grass plants were killed completely, whereas the rice plants, treated with a dose of 1 and 2 kg. of active substance per hectare, did not exhibit any damage and those treated with 4 kg. per hectare exhibited initiating damage.

What is claimed is:
1. A method of postemergently combatting the growth of Echinochloa crusgalli in paddy fields without causing leaf damage to rice plants comprising applying to said fields a herbicidally effective amount of 4,5,7-trichloro-2,1,3-benzthiadiazole.
2. The method of claim 1 wherein the 4,5,7-trichloro-2,1,3-benzthiadiazole is used before the Echinochloa crusgalli is in the fourth-leaf stage.
3. The method of claim 2 wherein the 4,5,7-trichloro-2,1,3-benzthiadiazole is used when the Echinochloa crusgalli is in the first-leaf to the third-leaf stage.
4. The method of claim 1 wherein 4,5,7-trichloro-2,1,3-benzthiadiazole is used on directly sown rice.
5. The method of claim 1 wherein the 4,5,7-trichloro-2,1,3-benzthiadiazole is employed in a concentration of 250 to 1000 grams per hectare.

References Cited
UNITED STATES PATENTS
3,279,909   10/1966   Daams et al.

JAMES O. THOMAS, JR., Primary Examiner